United States Patent [19]
Arroyo et al.

[11] Patent Number: 5,016,952
[45] Date of Patent: May 21, 1991

[54] CABLE CLOSURE INCLUDING SUPERABSORBENT FOAM WATER BLOCKING SYSTEM AND METHODS OF USING SAME

[75] Inventors: Candido J. Arroyo, Lithonia; David J. Meskell, Jr., Snellville; Francis J. Mullin, Chamblee, all of Ga.

[73] Assignee: AT&T Bell Laboratories, Murray Hill, N.J.

[21] Appl. No.: 455,106

[22] Filed: Dec. 22, 1989

[51] Int. Cl.$^5$ ................................................ G02B 6/36
[52] U.S. Cl. .............................. 350/96.20; 350/96.34
[58] Field of Search ................ 350/96.20, 96.21, 96.34

[56] References Cited

U.S. PATENT DOCUMENTS

| | | | |
|---|---|---|---|
| 3,545,773 | 12/1970 | Smith | 277/199 |
| 4,538,021 | 8/1985 | Williamson, Jr. | 174/92 |
| 4,558,174 | 12/1985 | Massey | 174/92 |
| 4,725,628 | 2/1988 | Garvey et al. | 521/137 |
| 4,725,629 | 2/1988 | Garvey et al. | 521/137 |
| 4,731,391 | 3/1988 | Garvey | 521/137 |
| 4,740,528 | 4/1988 | Garvey et al. | 521/128 |
| 4,799,757 | 1/1989 | Goetter | 350/96.20 |
| 4,802,732 | 2/1989 | Fukuma et al. | 350/96.34 X |
| 4,818,310 | 4/1989 | McNeal | 156/48 |
| 4,849,580 | 7/1989 | Reuter | 174/92 |

OTHER PUBLICATIONS

Article appearing in 11/20/89 Design News entitled "Foam Technologies Eliminates CFC's Reduce VOCs".
Article beginning at p. 260 of 1985 Intn'l. Wire & Cable Symposium Proceedings authored by I. H. Miller, et al.
Advertisement in brochure by P and C, Inc.
Brochure by Hoechst Celanese Corporation on product referred to as SanFoam TM superabsorbent foam.
Article authored by I. P. Beltz, et al., "A Novel Adhesive Closure System for Heat Receivable Sleeves" at 1987 Int'l Wire & Cable Symposium Proceedings.

*Primary Examiner*—John D. Lee
*Assistant Examiner*—Stephen W. Barns
*Attorney, Agent, or Firm*—E. W. Somers

[57] ABSTRACT

A cable closure (20) which is suitable for aerial, pedestal, wall-mounted or buried use and which is suitable for enclosing connections between metallic or optical fiber transmission media includes a base (30) and a cover (32). The base and/or the cover include a plurality of openings through which extend cables. Connections (50) between transmission media of the cables are disposed between portions (51,52) of a superabsorbent compliant foam material. The portions of the foam material and the base and the cover are sized so that when the cover is assembled to the base, the foam material is compressed. Upon contact with water which may enter the closure, the superabsorbent foam material swells, molding about the connections to protect them from the water and expanding outwardly to seal any unintended openings in the housing and prevent the ingress of additional water.

16 Claims, 2 Drawing Sheets

CABLE CLOSURE INCLUDING SUPERABSORBENT FOAM WATER BLOCKING SYSTEM AND METHODS OF USING SAME

TECHNICAL FIELD

This invention relates to a cable closure having a superabsorbent foam water blocking system and methods of using same. More particularly, the invention relates to a closure which includes a cellular swellable water blocking material and which may be used for protecting splice connections, for example, of optical fiber or metallic conductor transmission media.

BACKGROUND OF THE INVENTION

The use of communication cables which include a plurality of optical fibers is rapidly expanding. An optical fiber cable may comprise a plurality of optical glass fibers each of which is protected by at least one layer of a coating material. The optical fibers may be assembled into units in which the fibers are held together by binder ribbons or tubes to provide a core. Another optical fiber cable core includes a ribbon type optical fiber arrangement in which a plurality, such as twelve fibers for example, are arrayed together side by side. A plurality of these ribbons may be stacked to obtain a high fiber count cable. The core is enclosed by a plastic core tube and a plastic jacket. Also, the cable may include metallic strength members or the cable may be all-dielectric.

Whatever the structure of a transmission cable, there must be provisions for splicing transmission media at an end of a given length of cable to corresponding transmission media at an adjacent end of another length of cable. Where two ends of a cable such as a telecommunications cable are spliced together, the splice area is ordinarily housed within a protective arrangement. It is conventional to use a splice closure, within which the transmission media are spliced, wrapped and stored and protected environmentally. Such closures often have included cylindrical covers with one or more longitudinal joints and end plates that surround incoming and outgoing cables and that form seals with the covers. Closures which are effective in providing protection for the splice connections are available in the marketplace, but the assembly of some of these is relatively time consuming, often requiring specialized tools and equipment which in a limited space such as in an underground tunnel or on an overhead pole or line may be difficult to handle and operate.

Optical fiber cables and associated apparatus such as a cable closure, for example, are typically designed and manufactured to avoid problems which may be caused by a variety of anticipated environmental conditions to which the cable and associated apparatus will be exposed. One such condition is the exposure of portions of the cable and the cable closure to water. Potential problems associated with this condition are the entry of water into internal potions of the cable as well as the entry of water into the cable closure in which the cable has been terminated, spliced, stored or branched.

The entry of water into a cable closure is an undesirable condition because water generally has a detrimental effect on the enclosed optical fiber cable, the optical fiber and internal portions of the cable closure. For example, water vapor may attack surface flaws of the external surface of the glass optical fiber and cause stress corrosion. In the presence of water and stress in the optical fiber, a surface flaw in the optical fiber will tend to grow in size. This may result in lower tensile stress fiber breaks. Another detrimental effect from the presence of water in a closure may result if the water freezes. Such a condition may subject the fiber and internal portions of the cable and closure to damaging mechanical loads.

Common to substantially all closures is the requirement that they restrict moisture ingress. In some prior art closures, sealing an optical fiber cable closure to prevent the ingress of water has depended on effecting three different seals. One is a seal formed between a portion of an outer surface of an outer jacket of the cable and a surface of the closure or a surface that is independently sealable with the cable closure. At times it becomes somewhat difficult to match the size and sometimes deformed shape of a cable with flexed seals. A second cable closure seal is a seal associated with a closure cover. The cover portion is caused to seal with, for example, a closure bulkhead portion through which cables extend into the closure. Steps also must be taken, such as by filling interstices in the cable with a water blocking compound or by including a water blocking tape as a sheath component to prevent water that enters interior portions of the cable at a point outside the cable closure from travelling along the length of the cable between adjacent cable sheath components.

In the prior art, it is not uncommon to use a pressurized gas system to prevent the intrusion of moisture. Some systems employ dry air, nitrogen or a similar chemically inert gas in the cables and closures. In this type of reenterable closure, the gas is pressurized to create a flow from enclosed equipment through any openings and prevent the ingress of moisture. In such a system, it is advantageous to minimize the amount of gas leakage to reduce the consumption of pressurized gas and to insure against any requirement of high gas flow to maintain adequate pressure throughout the system. Accordingly, closures and associated equipment should be sealed sufficiently to prevent a reduction in pressure and the loss of gas. At the same time, it is necessary to provide a system which is easily assembled in the field and in which the probability of installer error is relatively low.

Heretofore a number of sealed closure designs have been made available. However, some of these have employed somewhat complicated sealing mechanisms which have added to the cost and which may have required close attention to assemble. Efforts have been made to provide closures which may be assembled more rapidly, which are less craft sensitive and which include fewer parts.

Another commonly used approach of preventing the ingress of water into a closure is to cause the closure to be filled with an encapsulant material. Such a closure may include two sections defined by two bulkheads with cable sealing grommets through which cables extend and a closure cover which is tubular and which has a closed end and an open end. A cable end portion is extended through a first bulkhead into a first chamber and portions of the cable sheath system are removed so that only an end portion of a core tube extends through a second bulkhead into a second chamber. In the just-described closure in which encapsulant materials are used to effect water blocking of the cable sheath system, splice connections are typically located in the second chamber. The blocking of water through portions of the able sheath components into the cable closure occurs in the first chamber. The closure cover is fastened securely and the first chamber is caused to receive a liquid encapsulant material. The encapsulant material is allowed to cure, thus forming a solid potting compound that surrounds the splice connections. The solid, cured potting compound effectively prevents water from entering the cable closure through portions of the cable sheath components.

The just-described cable water blocking arrangement is most practical when access to the interior of the cable closure is not anticipated. Reentry into the closure would most often occur if a new cable were being spliced or connected to another cable within an in-use closure. To effect the introduction of a new cable into the closure, at least a portion of the cured encapsulant material within the closure would have to be removed. The first chamber of the closure is re-potted after a portion of the new cable is introduced to reestablish the closure water blocking capability. The removal of cured encapsulant material and the installation of new encapsulant material is a laborious task. What is needed is a closure which provides at least the same level of protection against water as does an encapsulant, yet is one which presents fewer housekeeping problems.

Notwithstanding the above-enumerated problems, it continues to be necessary to splice together the ends of transmission media such as optical fiber cables in field locations. A new closure is sought after to facilitate splicing in which suitable protection is afforded the optical fibers. Provisions must be included in the sought-after splice closure for holding mechanical splices as well as fusion splices. What is needed and what seemingly is not provided for in the art is a simple system for protecting connective work within a closure from moisture. The sought-after system should be one which allows for relatively easy reentry, which includes few parts, and which is less craft sensitive than prior art closures to stem increasing labor costs.

SUMMARY OF THE INVENTION

The foregoing needs have been met by the cable closures of this invention. A cable closure of this invention includes first and second members such as a base and a cover which cooperate to provide a housing. At least one of the members such as, for example, the base includes a plurality of openings therethrough to allow cables to be spliced to extend into the housing. A mass of a superabsorbent compliant foam material is caused to be disposed in at least one of the members or in both the cover and in the base. The superabsorbent foam material is such that it swells on contact with water. A suitable cellular water swellable material is a cross-linked polyurethane foam composition. Splice connections among cables which extend into the closure are disposed along one surface of a mass of the water swellable material. The cover is adapted to be secured to the base. The foam material is sized so that when the cover is secured to the base, the cover applies compressive forces to the mass of foam material. This causes the foam material to become rearranged within the closure and to mold about the splice connections. As a result, the splice connections become embedded in the mass of compliant foam material. Should water enter the closure through interstices in the cable and portions of the base or cover or along conduits formed between layers of the cable structure, the contact of the water with the superabsorbent foam causes the foam to swell and block the flow of the water within the closure and prevents contact of the water with the transmission media or with the connections. Further, portions of the foam material are caused to be disposed about the openings through which cables extend to seal the openings and prevent subsequent ingress of water.

A transmission system of this invention includes the hereinbefore described cable closure and cables each of which includes a water blocking material. Preferably, the water blocking material is a tape or yarn which is arranged longitudinally or helically about a cable core and which swells upon contact with water to prevent the flow of water longitudinally along the cable.

BRIEF DESCRIPTION OF THE DRAWING

Other features of the present invention will be more readily understood from the following detailed description of specific embodiments thereof when read in conjunction with the accompanying drawings, in which.

DETAILED DESCRIPTION

Figure 1:
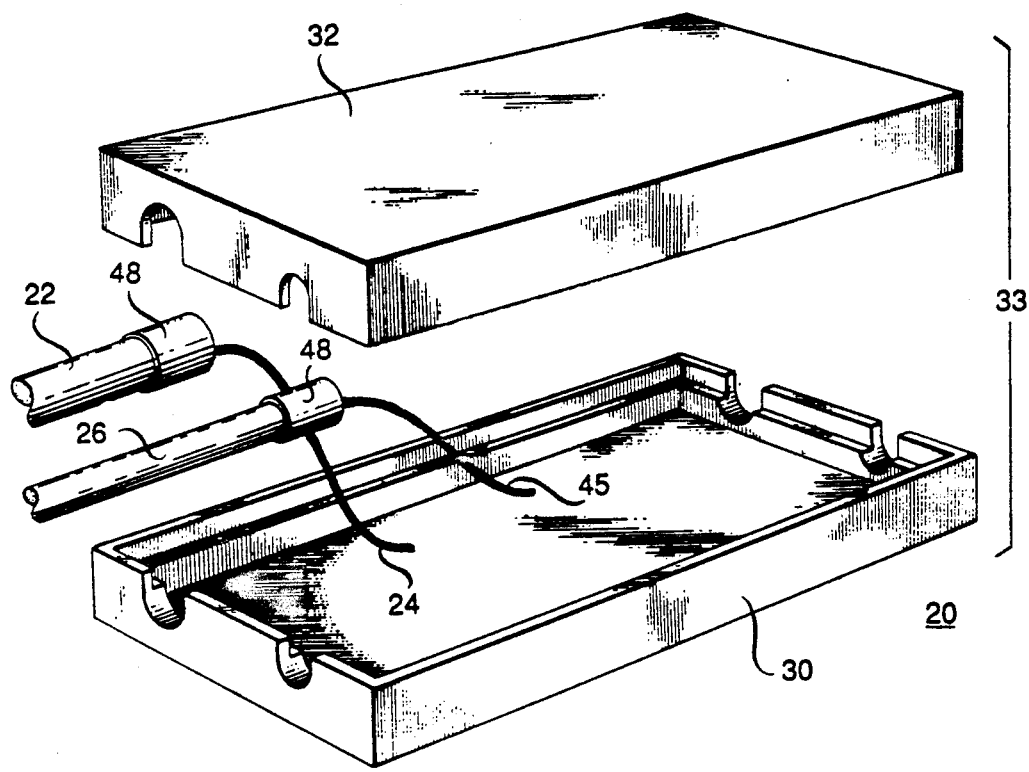
FIG. 1 is a perspective view of a base and a cover of a closure of this invention.
Figure 2:
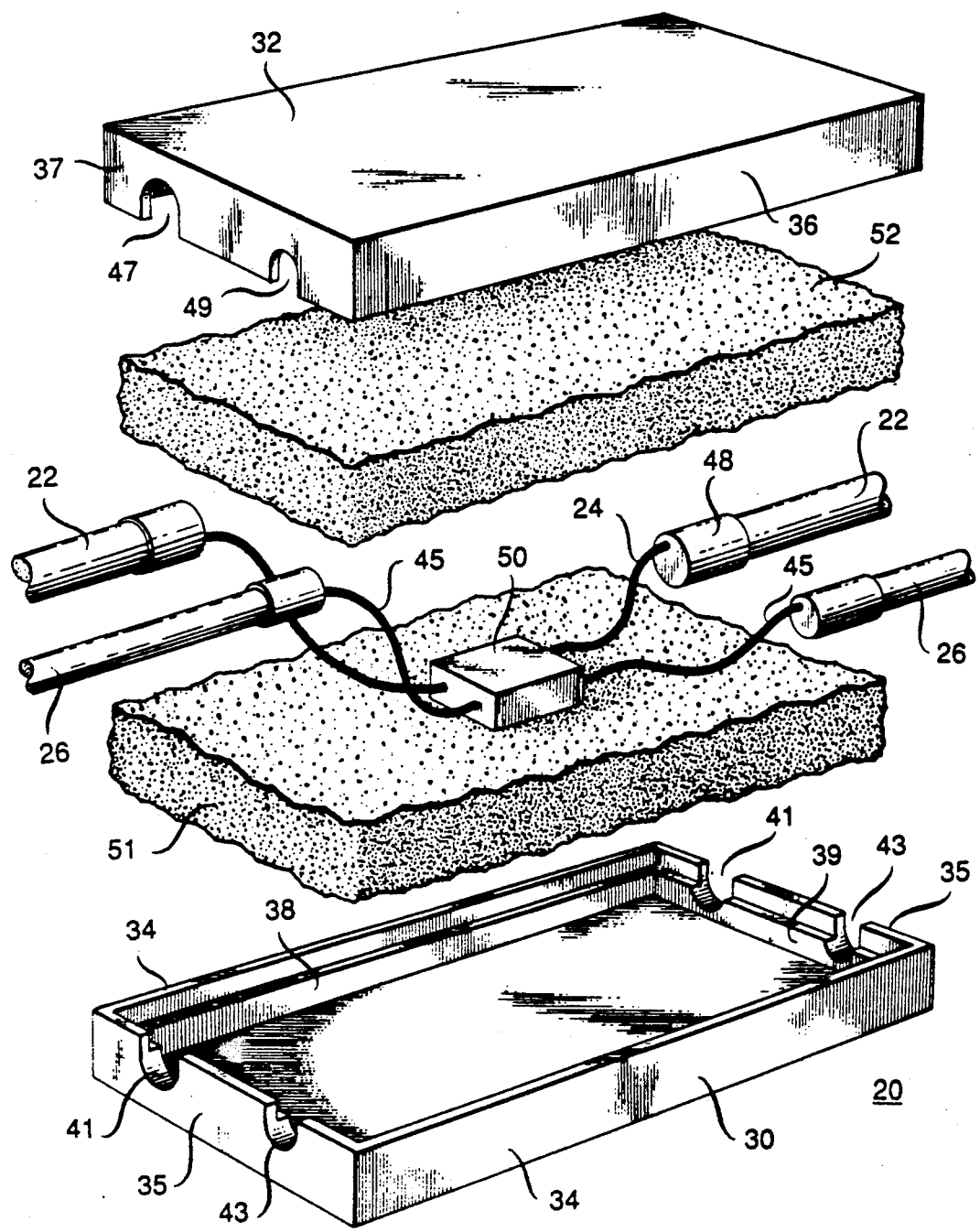
FIG. 2 is an exploded perspective view of the closure of this invention with the cover positioned to be secured to the base with pads of foam material disposed about connections.

Referring now to FIGS. 1 and 2, there is shown a perspective view of a cable closure which is designated generally by the numeral 20. The cable closure 20 is used to protect connections and/or splices among transmission media which extend into and/or through the closure. As is shown in FIGS. 1 and 2, a distribution cable 22 which includes a plurality of transmission media 24—24 extends into the closure 20. Also extending into the closure 20 is one or more service cables such as the cable 26 shown in FIG. 1. The service cable 26 is to be connected or spliced to the distribution cable 22 within the closure and then run to a customer's premises, for example.

Viewing now FIGS. 1 and 2, it can be seen that the closure 20 includes a base 30 and a cover 32 which cooperate when assembled together to provide a housing 33. The base and the cover 32 may be made of a plastic material such as ABS resin, for example, which is suitable to withstand exposure to the environment in a multitude of geographical areas.

The base 30 includes two side walls 34—34 and two end walls 35—35 whereas the cover includes opposed side walls 36—36 and opposed end walls 37—37. As can be seen in the drawings, the side and end walls of the base 30 may be provided with ledges 38—38 and 39—39, respectively. The cover 32 is sized to mate with the base in a manner such that sides and ends of the cover are supported on the ledges 38—38 and 39—39 of the base.

Through each one of the end walls 35—35, for example, may be provided an opening 41 and an opening 43. Each distribution cable 22 extends through an opening 41 into the housing where the transmission media 24—24 thereof are connected and/or spliced to transmission media 45—45 of one or more service cables 26. Each service cable 26 extends through an opening 43 into the housing. Of course, additional openings may be provided in the same or opposite end wall or in either or both of the side walls to allow entry of additional distribution and/or service cables. Also, as can be seen in the drawings, the cover 32 is provided with openings 47—47 and 49—49 to cooperate with the openings 41—41 and 43—43 in the base 30 to allow entry of the cables when the base and the cover are assembled together. Each of the cables may be provided with a grommet 48 to cooperate with the wall of the opening in the housing through which each cable extends to anchor the cable and to inhibit the entry of moisture.

The connections and/or splices within the closure 20 among the transmission media of the cables which are depicted generally by the numeral 50 may be made by any one of several well known connector and/or splicing systems available commercially. For example, should splice connections among metallic conductors need to be made, the splicing connector of D. R. Frey, et al. U.S. Pat. No. 3,772,635 which issued on Nov. 13, 1973 may be used. Should the cables be optical fiber cables, then the rotary splice connector disclosed in G. F. DeVeau et al., U.S. Pat. No. 4,545,644 which issued on Oct. 8, 1985 and/or the array connector disclosed in an article authored by T. L. Williford, Jr., et al. entitled "Interconnection for Lightguide Fibers" which appeared beginning at page 87 in the winter 1980 issue of *The Western Electric Engineer* may be used.

In order to provide the closure 20 with a water blocking capability, the closure includes a superabsorbent foam material which is compliant. Such a material is available commercially and may be one such as the superabsorbent polyurethane foam disclosed in U.S. Pat. No. 4,725,628 which issued on Feb. 16, 1988 and which is incorporated by reference hereinto.

In a preferred embodiment, the superabsorbent polyurethane foam contains a plurality of polycarbonyl moieties covalently attached to the polyurethane through at least one urethane, thiourethane, or urea linkage. The polycarbonyl moieties comprise from about 5 to about 100 carbonyl-containing repeating units which may be the same or different. Also, the carbonyl portions are selected from the group consisting of carbamoyl, substituted carbamoyl, and carboxy and alkali metal and ammonium salts thereof. The polyurethane is derived from an isocyanate-terminated poly(oxyalkylene) polyol having an isocyanate functionality greater than two whereas the polycarbonyl moieties are derived from acrylate or methacrylate salts, i.e. alkali metal or ammonium salts of acrylic or methacrylic acid.

Processes for making superabsorbent polyurethane foams are disclosed in the above-identified U.S. Pat. No. 4,725,628. A method of preparing a superabsorbent polyurethane foam comprises the steps of (A) mixing an isocyanate-terminated polyurethane prepolymer having an isocyanate functionality greater than two with at least one first compound having at least one isocyanate-reactive group and at least one carbon-carbon double bond. The amount of the first compound is insufficient to reduce the isocyanate functionality of the prepolymer to a value equal to or less than two. In step (B), the mixture obtained in Step A is allowed to react substantially completely. In step (C), the reaction product from Step B is mixed with an aqueous solution of at least one carbonyl-containing second compound having at least one carbon-carbon double bond capable of undergoing addition polymerization with the first compound and with itself under the conditions of the polyurethane foam formation. The carbonyl group of the second compound is selected from the group consisting of carbamoyl, substituted carbamoyl, and carboxy and the alkali metal and ammonium salts thereof.

At least one thermally activated free radical initiator is dissolved in either the reaction product from Step B or the aqueous solution. The carbon-carbon double bond of the first compound is capable of undergoing addition polymerization with the second compound under the conditions of the polyurethane foam formation. Further, the proportions of the first and second compounds are selected to impart superabsorbent properties to the resulting polyurethane foam.

The reaction product from Step B, or modified prepolymer, may be reacted with one or more third compounds having at least two carbon-carbon double bonds capable of both homopolymerization with other third compound molecules and copolymerization with the first compound(s) present in the modified prepolymer. Such a reaction is carried out in the presence of a free radical initiator.

In a preferred embodiment, the isocyanate-reactive group of the first compound is selected from the group consisting of hydroxy, mercapto, and amino groups. In another embodiment, the first compound contains a carbonyl group selected from the group consisting of carbamoyl, substituted carbamoyl, and carboxy and esters thereof. The first compound may be one selected from the group consisting of hydroxyethyl acrylate and hydroxyethyl methacrylate, the second compound may be one selected from the group consisting of acrylamide, methacrylamide, potassium acrylate, and potassium methacrylate, and the prepolymer may be an isocyanate-terminated poly(oxyalkylene) polyol.

Processes for making superabsorbent polyurethane foam material are disclosed also in U.S. Pat. Nos. 4,725,629 and 4,725,391 each of which is incorporated by reference hereinto. Another suitable material suitable for use in the closure of this invention is one referred to as SanFoam# superabsorbent foam. This product is available from Hoechst Celanese Corporation and has relatively high absorbence for aqueous liquids.

The above-described superabsorbent material may be provided in pad form. As such, a pad 51 of the foam material is dimensioned to be received within the base 30. Another pad 52 of the superabsorbent material is dimensioned to be received within the cover 32. The superabsorbent material may be made available in varying thicknesses and shaped to fit particular size bases and covers of closures.

Figure 3:
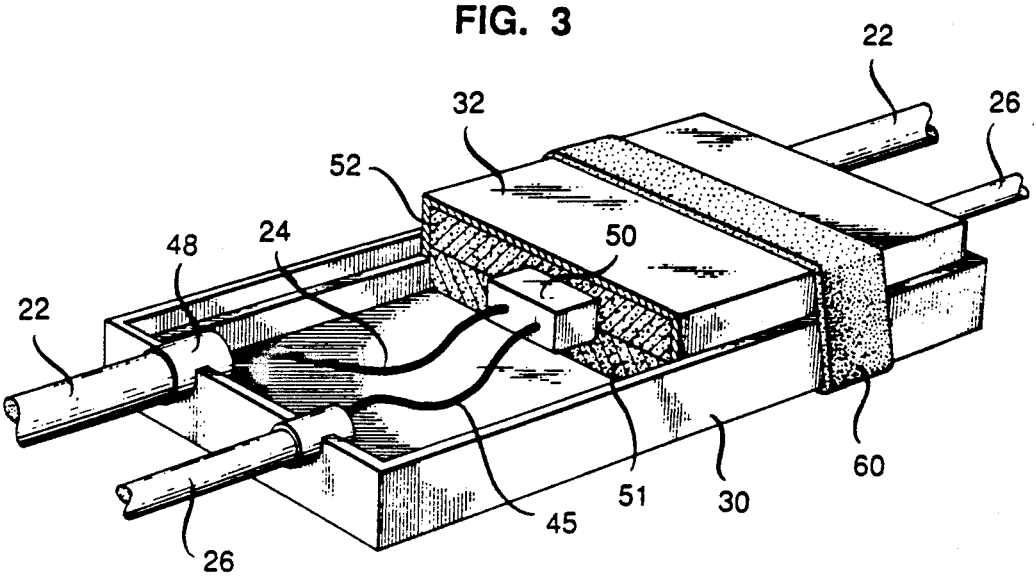
FIG. 3 is a perspective view of a fragmented portion of the cover secured to the base.

As mentioned earlier, the cover is adapted to be assembled to the base. Then the cover 32 is secured to the base 30. This may be accomplished by any number of well known arrangements such as, for example, bands 60—60 (see FIG. 3) which encircle the assembled cover and housing or a latch system with a cover hinged to the housing such as is shown in U.S. Pat. No. 4,849,580. See also U.S. Pat. No. 4,538,021 which issued on Aug. 27, 1985 in the name of A. H. Williamson, Jr. which is incorporated by reference hereinto and which discloses a latching system for securing together portions of a closure.

The thicknesses of the pads 51 and 52 of the superabsorbent material are selected so that when the cover 32 is secured to the base 30 with the splice connections 45 disposed between the two pads 51 and 52 of superabsorbent material, the pads of compliant material are compressed. This causes the compliant foam material to mold about the connections or splices, causing the connections or splices connections and/or splices to be embedded in the foam material. The molding of the foam material about the connections and/or splices occurs without disrupting the connections and/or splices.

When water enters the closure 20 either by way of the openings in the closure or by way of longitudinal travel along the cable between layers of the sheath system, the water contacts the superabsorbent foam material. Contact of the water with the foam material causes the superabsorbent foam material to swell. Because the cover is secured to the base, the swelling of the superabsorbent foam material causes portions of the foam to be extruded into any unintended openings in the housing to seal such openings. Also, the swelling causes the foam material to be further compressed. As a result, the connections become further embedded in the superabsorbent foam material thereby preventing the water from reaching the connections.

As moisture contacts the foam material, it becomes more soft and more pliable and molds further about connections and/or splices. Foam material about the periphery of the closure housing which may be the first contact with water, swells and protects the inner, virgin material.

The closure of this invention has a number of important advantages. For example, there is no mixing required of components in order to provide an encapsulant system. Also, no pouring of an encapsulant material is required at ground level or overhead in serial installations. There is no limitation on size and any of several well known arrangements may be used to secure together those structural components which comprise the closing. The closure is clean, self-healing, that is, its water blocking system is activated upon entry of water and it is user friendly.

Also, as is known, freezing weather may cause encapsulant materials during low temperatures to contract. As a result, paths may be provided along which water can enter the closure. On the other hand, the system of this invention is not so affected by low temperature. The superabsorbent foam material is characterized by an open cell structure. When water enters the closure, the foam swells not only internally of the closure but also in an outwardly direction effectively forming plugs to prevent the entry of additional water.

It is contemplated that those portions, i.e. the base 30 and the cover 32, which form the housing will be pre-provided with the pads of the foam material. In the field, a craftsperson need only perform the connecting or splicing and cause the connections and/or splices to become disposed between the cover portions. Of course, pads of the superabsorbent foam material could be installed in the field, being drawn from an inventory of various sizes and shapes, or custom-fitted from a supply length.

It is to be understood that the above-described arrangements are simply illustrative of the invention. Other arrangements may be devised by those skilled in the art which will embody the principles of the invention and fall within the spirit and scope thereof.

We claim:

1. A cable closure, which includes:
   a housing which includes:
     a first member; and
     a second member which is adapted to be assembled to said first member and to be secured thereto with at least one of said first and second members including a plurality of openings through which are adapted to extend cables having transmission media which are to be connected together within said housing; and
   a pad comprising a superabsorbent foam material which is disposed within at least one of said first and second members in such a manner that when said first and second members are assembled together to provide said housing, said pad of superabsorbent foam material is compressed to conform about the connections therein, said superabsorbent foam material upon contact with water swelling into interstices among transmission media of cables which extend into said closure.

2. The cable closure of claim 1, wherein said first member is a base and said second member is a cover and said base and said cover each are provided with a paid of the superabsorbent foam material, one pad of said superabsorbent foam material being disposed in said base and another pad of said superabsorbent foam material being disposed in said cover with connections between transmission media which extend into said closure being captured between said pads of said superabsorbent foam material.

3. The cable closure of claim 1, wherein said foam material comprises a compliant crosslinked polyurethane foam composition.

4. The cable closure of claim 3 wherein said superabsorbent foam material is one which includes a plurality of polycarbonyl moieties covalently attached to the polyurethane through at least one linkage which is selected from the group consisting of urethane, thiourethane and urea linkage.

5. The cable closure of claim 4, wherein said foam material comprises a polyurethane foam in which the carbonyl portions of said polycarbonyl moieties are selected from the group consisting of carbamoyl, substituted carbamoyl, carboxy and alkali metal and ammonium salts thereof.

6. The cable closure of claim 5, wherein said superabsorbent crosslinked polyurethane foam is prepared by the steps of:
   A. mixing an isocyanate-terminated polyurethane prepolymer having an isocyanate functionality greater than two with at least one first compound having at least one isocyanate-reactive group and at least one carbon-carbon double bond, the amount of said first compound being insufficient to reduce the isocyanate functionality of the prepolymer to a value equal to or less than two,
   B. allowing the mixture obtained in Step A to substantially completely react; and
   C. mixing the reaction product from Step B with an aqueous solution of at least one carbonyl-containing second compound having at least one carbon-carbon double bond capable of undergoing addition polymerization with said first compound and with itself under the conditions of the polyurethane foam formation, the carbonyl group of said second compound being selected from the group consisting of carbamoyl, substituted carbamoyl, and carboxy and the alkali metal and ammonium salts thereof;
   in which at least one thermally activated free radical initiator has been dissolved in either the reaction product from Step B or said aqueous solution, said carbon-carbon double bond of said first compound is capable of undergoing addition polymerization with said second compound under the conditions of the polyurethane foam formation; and the proportions of said first and second compounds are selected to impart superabsorbent properties to the resulting polyurethane foam.

7. The cable closure of claim 6, in which said isocyanate functionality is equal to or greater than about 2.3.

8. The cable closure of claim 7, wherein said first compound is selected from the group consisting of hydroxyethyl acrylate and hydroxyethyl methacrylate.

9. The cable closure of claim 8, wherein said second compound is selected from the group consisting of acrylamide, potassium acrylate and potassium methacrylate.

10. A spliced transmission media system which includes water blocking provisions, said system including:
a first transmission medium;
a second transmission medium which is connected to said first transmission medium; and
a closure into which extend said first and second transmission media and within which said second transmission medium is connected to said first transmission medium, said closure including:
a housing which includes:
a base which includes a plurality of openings through which extend said transmission media, and
a cover which is adapted to be assembled to said base and to be secured thereto; and
a pad comprising a superabsorbent foam material which is disposed within said housing in such a manner that when said cover is assembled and secured to said base, said pad of superabsorbent foam material is compressed about the connections of said second transmission medium to said first transmission medium, said superabsorbent foam material upon contact with water swelling into interstices among the transmission media and connections therebetween to inhibit the migration of water within the closure.

11. The system of claim 10, wherein said foam material comprises a crosslinked polyurethane foam composition.

12. The system of claim 11, wherein said superabsorbent foam material is one which includes a plurality of polycarbonyl moieties covalently attached to the polyurethane through at least one linkage which is selected from the group consisting of urethane, thiourethane and urea linkage.

13. The system of claim 12, wherein said foam material comprises a polyurethane foam in which the carbonyl portions of said polycarbonyl moieties are selected from the group consisting of carbamoyl, substituted carbamoyl, carboxy and alkali metal and ammonium salts thereof.

14. The system of claim 10, wherein pads comprising said superabsorbent foam material are attached to said base and to said cover prior to installation of said closure.

15. The system of claim 10, wherein pads comprising said superabsorbent foam material are caused to be disposed in said base and in said cover during the installation of said closure.

16. A method of splicing a first transmission media to a second transmission media, said method comprising the steps of:
providing a first housing member;
providing a second housing member;
causing a pad of superabsorbent foam material to be disposed in the first and in the second members such that when the members are secured together, the pads of superabsorbent foam material are compressed;
causing a first transmission medium to extend into one of the housing members;
causing a second transmission medium to extend into one of the housing members;
splicing the first transmission medium to the second transmission medium; and
securing the first and second housing members together to provide a housing and to compress the pads of superabsorbent foam material disposed in the first and second members with splice connections between the transmission media being disposed between the superabsorbent foam material in the first and second housing members, said superabsorbent foam material upon contact with water swelling into interstices among the transmission media and connections therebetween to inhibit the migration of water with the closure.

* * * * *